Dec. 20, 1966 J. M. LEHRY 3,293,520
ARRANGEMENT FOR GENERATING A ROTARY MOVEMENT
AT A VARIABLE SPEED
Filed Oct. 16, 1962 2 Sheets-Sheet 1
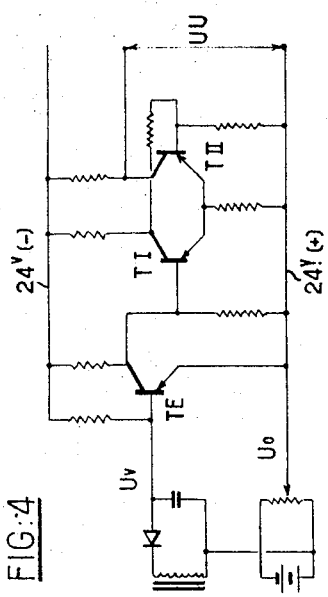
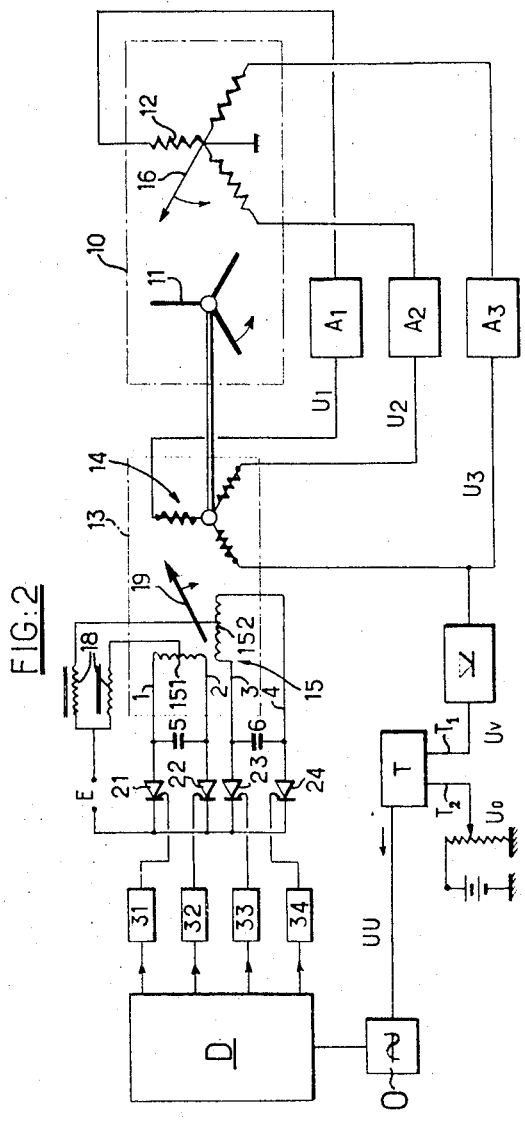
Inventor:
Jean Marie Lehry
By: Spencer & Kaye
Attorneys United States Patent Office 3,293,520
Patented Dec. 20, 1966

3,293,520
ARRANGEMENT FOR GENERATING A ROTARY
MOVEMENT AT A VARIABLE SPEED
Jean Marie Lehry, 282 Rue St. Jacques, Paris, France
Filed Oct. 16, 1962, Ser. No. 230,863
Claims priority, application France, Oct. 28, 1961,
877.346
3 Claims. (Cl. 318—227)

My invention has for its object an arrangement for generating a rotary movement at a variable speed and more particularly it covers a system of electronic and electromagnetic components adapted to control an electric motor running at a variable speed.

The variable speed arrangements proposed hitherto resort either to D.C. motors or to motors with wound rotors. D.C. motors are expensive and delicate and the difficulties met in the execution of mechanically resistant commutators make their use objectionable on an industrial scale. Consequently the use of asynchronous motors with wound rotors have found a wide market, which motors require an electronic control system while offering however only a reduced scale of possible speeds together with a very low efficiency.

Hitherto asynchronous motors of the squirrel cage type energized at a variable frequency have been much less often used although such motors seem to form the ideal solution of the problem by reason of their easy execution and of their very high mechanical resistance. In the arrangements known hitherto, the feeding at a variable frequency has generally to be supplied, as a matter of fact, through the agency of an alternator driven at a variable speed by a group of the Ward-Leonard type, which forms a particularly intricate and expensive solution.

My invention has for its object a system of electronic and electromagnetic components adapted to supply the electric energy required for feeding an asynchronous motor of the squirrel cage type at a low price under variable frequency conditions so as to allow the use under optimum conditions of such a motor the speed of which may vary within a large range.

My invention consists chiefly in that the frequency of the current feeding the armature of the motor is defined at every moment through the addition of a basic frequency corresponding to the actual speed of rotation of the rotor of the motor and of a predetermined slip frequency.

Such an arrangement allows satisfying within a large range of speeds the ideal requirements for feeding the motor so as to make the latter execute under the best conditions the transformation of electromagnetic energy into mechanical energy.

The features and advantages of my invention will appear more clearly from the following description given by way of example, reference being made to the accompanying drawings wherein:

FIG. 1 is a diagram showing the torque-speed curve of an asynchronous motor,

FIG. 2 is a simplified wiring diagram of an arrangement according to my invention, FIG. 4 is a diagrammatic illustration of an embodiment of a tachometric control system.

Figure 3:
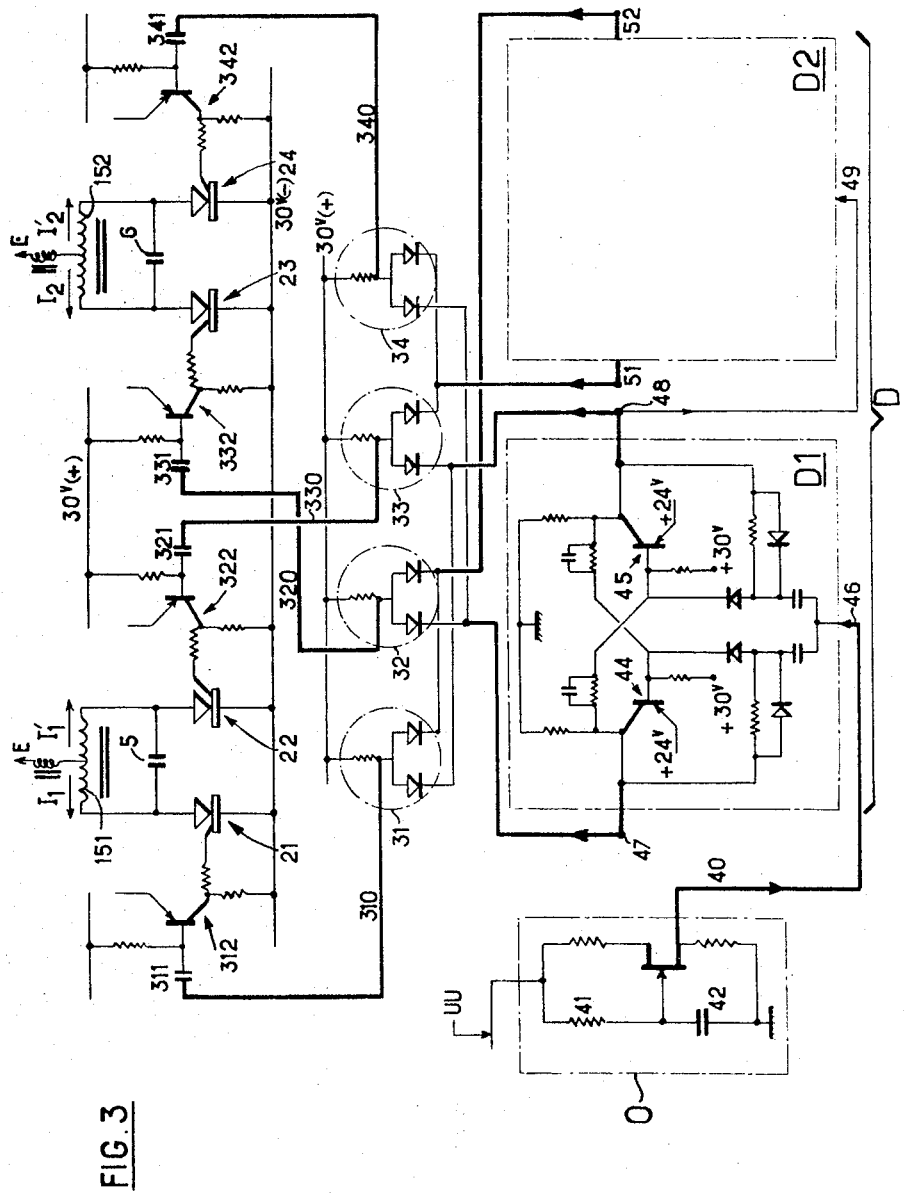
FIG. 3 is a wiring diagram of the circuitry feeding the alternator armature.

Turning first to FIG. 1 which shows the well-known torque-speed curve of an asynchronous motor, it should be considered that the feeding of the stator of such a motor with an alternating voltage at a predetermined frequency produces a field rotating at the so-called synchronous speed $Vs$; the latter is the speed at which the rotor revolves when under no load, assuming the various losses are reduced to zero. When the torque increases, the speed sinks down to a speed $Vm$ corresponding to a maximum torque CM, beyond which the speed decreases and the motor has a tendency to move out of step, the curve being then unstable. $Vg$ will designate herinafter the maximum slip, that is the difference between the synchronism speed $Vs$ and said speed $Vm$, said maximum slip corresponding to a predetermined maximum available torque CM.

In the diagram illustrated in FIG. 2, 10 designates a squirrel cage motor constituted by a rotor 11 and a stator 12, which may be three-phase for instance, whereas 13 designates a small-sized reference alternator, including an armature or rotor 14 and a field-piece or stator 15. The stator 12 of the motor 10 produces a rotary field as illustrated at 16, the squirrel cage rotor 11 rotating inside said field. The stator 12 is assumed to be wound in a manner such that, assuming it is fed at a predetermined frequency $f$, its field 16 will revolve at a speed corresponding to a pulsation at a frequency $f$. It is supposed that, as shown in FIG. 1, the rotor 11 revolves at a speed corresponding to said speed of rotation of the field, with a slowing down corresponding to the slip. In order to drive the rotor at a predetermined speed, it is therefore sufficient in principle to produce across the terminals of the stator 12 a three-phase voltage at a variable frequency adapted to produce at every moment the desired speed, said voltage being collected for instance across the terminals of a low-power variable three-phase supply frequency with a separate amplification for each of the three phases by a corresponding amplifier A1, A2, A3. Experience shows however that an arrangement thus designed risks dropping out of step under the action of an overload, which is always possible during operation, while the increase in speed meets with difficulties.

According to my invention, I use as a supply of polyphase voltage at a variable frequency to be applied across the inputs of the amplifiers A1, A2, A3, the wound rotor 14 of the reference alternator 13 which is coupled mechanically with the squirrel cage rotor 11 of the motor 10.

The alternator 13 includes a wound stator 15, which may be two-phase, for instance, in which case its two windings 151 and 152 have their medial points connected in series through the agency of corresponding inductances 18 with one of the poles of a D.C. supply whereas their outer terminals 1–2 and 3–4, shunted by corresponding capacitors 5 and 6 are connected with the other terminal of said supply of D.C. through the agency of a group of controlled rectifiers 21 to 24, preferably of the so-called single-thyratron type. The control electrodes of these rectifiers are connected with the corresponding outputs of a cooperating series of logical circuits 31 to 34 forming a decoding device fed by a subdividing system D fed in its turn by a relaxation oscillator O with a continuous series of pulses at a suitable rhythm. The feeding of said oscillator is ensured at a predetermined D.C. voltage UU by a tachometric control T as a function of the difference between the voltages $Uv$ and $Uo$ applied respectively to its terminals T1, T2. The voltage $Uv$ obtained through rectification of an A.C. voltage tapped off the input or output of the amplifier A3 for instance, forms a signal the amplitude of which is proportional, with a predetermined constant, to the speed of the motor 10 at the moment considered this proportion existing because the amplitude of the field produced in stator 15 remains constant over its variable-frequency operating range, whereas the voltage $Uo$ forms a reference signal tapped off the slider of an indicator potentiometer P, said signal defining the speed to be obtained.

The speed of the rotor 11 of the device shown in FIG. 2 is controlled in the following manner:

The rotating field 16 generated by the signals applied to the windings of stator 12 rotates at a speed Vs which, in the case here considered is equal to the frequency f of each of the applied signals. This rotating field causes the squirrel cage rotor to rotate at a rate Vm which equals the difference between Vs and the rotor slip frequency g. The armature 14 of alternator 13, because it is on the same shaft as rotor 11, is driven by rotor 11 at the same rotational speed Vm. The field piece 15 of alternator 13 is excited by signals produced by the circuit composed of oscillator O, subdividing system D, decoding means 31–34, D.C. supply E, and rectifiers 21–24, which circuit will be described in greater detail bleow. The manner in which this circuit feeds signals to the field-piece 15 causes a rotating field 19 to be generated therein. This field will rotate at a rate g which will be equal to the slip frequency induced in the rotor 11 of the principal motor 10. Since armature 14 is revolving at a rate Vm, the combination of this rotation and of the signals induced by the rotating field 19 will cause signals to be induced in each phase of this armature at a frequency equal to Vm+g. The resultant frequency is then applied to power amplifiers A1, A2 and A3, where they are amplified and applied as the excitation energy to the respective phases of stator 12. It may thus be seen that the relation between motor 10 and alternator 13 is such that the rate of rotataion of field 19 is at all times identically equal to the slip frequency in rotor 11 and the resultant additive frequency induced in armature 14 is at all times identically equal to the frequency which the excitation field 16 of stator 12 must have in order cause rotor 11 to rotate at a speed of Vm with a slip frequency of g. Since power amplifiers are employed between the output of armature 14 and the input to stator 12, alternator 13 may be a relatively small, low-power device with relation to motor 10, so that the field generated by field-piece 15 will be relatively weak and the rotation of armature 4 will place only a negligible load on rotor 11. It should be noted here that if the direction of rotation of field 19 were reversed, the resulting difference frequency, Vm—g, applied to stator 12 would exert a breaking action on motor 10.

If the speed of rotor 11 should vary from the desired value Vm, a signal will be produced by control T, to vary the pulse rate of oscillator O in such a direction as to alter the rate of rotation of field 19 so as to bring the sum of its rate and of the speed of armature 14 to a frequency which will cause the rate of rotation of field 16 to restore the speed of rotor 11 to the desired value Vm. When the speed of rotor 11 returns to this value, the input to T will return to zero and the rate of rotation of field 19 will return to its predetermined value.

FIG. 3 shows an embodiment of the supply of polyphase current (which is two-phase in the example disclosed), said supply being constituted by the arrangement including the oscillator O, the subdividing system D and the decoding means 31–34 in association with the D.C. supply E and the group of controlled rectifiers 21 to 24.

In said embodiment, the oscillator O is of the well-known single junction type: a relaxation oscillator of this type which is fed under a predetermined D.C. voltage UU feeds through its output 40 a continuous series of pulses at a rhythm defined by the time constant of the circuit including the resistance 41 and the capacitor 42, said rhythm being furthermore proportional within certain limits to the value of the feed voltage.

The subdividing system D is constituted in the case considered by a series arrangement of two bistable multivibrators D1, D2 of a similar structure including two transistors such as 44, 45, for instance. The output 40 of the oscillator O is connected with the input 46 of the first bistable multivibrator D1 of which the two outputs 47, 48, start from the collectors of the transistors 44, 45. The first output 48 of the bistable multivibrator D1 is connected with the input 49 of the bistable multivibrator D2 of which the two outputs are shown at 51 and 52. As well-known in the art, the outputs 47 and 48 of the first bistable multivibrator D1 change their condition at the rhythm of the pulses fed by the oscillator, whereas the outputs 51, 52 of the second bistable multivibrator D2 change their condition after each two pulses of the oscillator.

Each of the logical circuits of the decoding means 31 to 34 is of the so-called AND type including two diodes, while the outputs such as 310 of said circuits are normally at a low voltage and feed a positive voltage when the two corresponding diodes are locked simultaneously. As may be easily ascertained, each of said circuits has one diode connected with an output of D1 and the other with an output of D2, so that said locked condition is obtained in succession for the successive circuits 31 to 34 at the rhythm of the pulses produced by the oscillator O and for durations corresponding to the period separating said pulses.

The positive pulses thus produced cyclically on the terminals 310, 320, 330, 340 are applied through the agency of connecting capacitors 311 . . . 341 and of transistor amplifiers 312, 342 . . . corresponding thereto, to the control electrodes of the controlled rectifiers 21 to 24. The positive front of each pulse, passing through the connecting capacitor, produces through a transient locking of the associated transistor which is normally conductive a transient conductivity through the corresponding controlled rectifier. A pulse appearing at the output 310 for instance ignites the rectifier 21 and allows the passage of a current $I_1$ in the left-hand half of the winding 151; the next pulse, appearing at 320, ignites the rectifier 23 and allows the passage of a current $I_2$ through the left hand half of the winding 152. The third pulse, appearing at 330, provides at 22 the production of a current I' through the righthand half of the winding 151 together with the blowing out of the rectifier 21, the current $I_1$ being cut off through an induction effect associated with the discharge of the condenser 5 underneath the maintenance threshold of said rectifier. These operations continuing in the manner disclosed, it is apparent that a complete cycle corresponds to a series of four pulses of the oscillator O so that the windings 151 and 152 will form the seat of A.C. at a frequency g, if 4g designates the recurrent frequency of the oscillator O, the currents in the two windings being furthermore phase-shifted with reference to each other by 90°. The capacitors 5 and 6 are designed so as to cut out most of the harmonics and to give consequently a substantially sinusoidal shape to the currents obtained. Of course, in the case of an n-phase current in the alternator field-piece, the recurrent frequency in the oscillator would be 2ng and the phase shifting would be correspondingly 360°: n between the alternator field-piece windings.

Referring again to FIG. 2, it is thus apparent that the field-piece 15 produces in the reference alternator 13 a field rotating at a speed corresponding to the frequency g while the frequency of the voltages U1, U2, U3, collected across the terminals of the armature 14, with a phase-shifting by 120°, will form the sum of a basic frequency corresponding to the speed of rotation of the rotor 11 of the motor at the moment considered and of the frequency g. These voltages, after amplification respectively at A1, A2, A3, define the speed of rotation of the rotary field 16 of the motor and consequently said field will revolve always ahead of the rotor with a speed corresponding to the predetermined frequency of slip g; it is consequently an easy matter to suitably select said frequency g through adjustment of the frequency 4g of the oscillator O, so as to maintain under all circumstances, the optimum speed of slip as defined by the characteristic properties of the motor.

The system thus constituted has a natural tendency to race and the tachometric control T has for its object to cut out this cause of instability; it may be designed for instance in a manner such that the oscillator O is fed only when the rotary speed corresponding to the voltage Uv is lower than the desired speed corresponding to the voltage Uo. The oscillator when operative applies a maximum torque to the motor shaft the speed of which increases until it rises above the desired value. The signal corresponding to the difference $Uv-Uo$ being then equal to zero, the oscillator ceases operating and so on.

A very simple embodiment of a control through hit or miss is given out by FIG. 4. The voltage corresponding to the difference $Uv-Uo$ is applied between the base and the emitter of a transistor TE, followed by a monostable multivibrator system including two transistors TI, TII, the feed voltage UU for the oscillator being collected for instance between the collector of the transistor TII and ground. According as to whether the difference in voltage applied at the input is higher at lower than a predetermined threshold, the collected voltage UU will vary between a very low value (TII being locked) and a value of the magnitude of the feed voltage of the system when TII is conductive.

It is obviously an easy matter to resort instead of to such a hit or miss control, to proportional control, since, as already disclosed, the recurrent frequency of the oscillator O as illustrated, is proportional to the value of its feed voltage. The slip frequency may thus be caused in this case to vary as a function of the instantaneous value of the difference in speed $Uv-Uo$.

It is possible lastly to reverse the phase relationship of the voltages U1, U2, U3 so as to produce a field 16 revolving at a speed lower by Vg than the speed of the shaft, Vg corresponding to the above described frequency g. This provides an ideal braking action on the shaft, as generally sought for and even essential for electronic speed variators.

It should be remarked furthermore that, the energizing voltage applied to the reference alternator being constant, the voltage U1, U2, U3 collected across its terminals is substantially proportional to the speed of rotation of the motor; this forms an ideal condition for feeding an asynchronous motor under variable speed conditions. With a voltage remaining constant for instance, one would obtain, as a matter of fact, by reason of the inductive impedance of the motor, a lack of intensity under high speed conditions, and consequently a lack of torque or, in contradistinction, a prohibitive intensity, leading to an exaggerated heating for low frequencies and speeds.

What I claim is:

1. A device for producing a controlled variable-speed rotation comprising:
    (a) an asynchronous motor comprising a squirrel-cage rotor, the speed of rotation of which is to be controlled, and a stator winding;
    (b) an alternator comprising a rotary armature mechanically driven by said squirrel-cage rotor and a field-piece of the polyphase type for producing a rotating field which turns at a rate equal to the slip frequency voltage induced in said squirrel-cage rotor;
    (c) power amplifier means having inputs connected to said armature and outputs connected to said stator winding for supplying excitation energy to the latter;
    (d) a source of polyphase signals connected to said alternator field-piece for supplying excitation energy thereto;
    (e) a D.C. power supply connected to the center of each phase of said field-piece;
    (f) a plurality of electronically controlled switch means connected to each end of each of said phases for controlling the direction of current flow from said power supply through each of said phases;
    (g) relaxation oscillator means generating a continuous train of pulses at a rate equal to $2ng$, where $n$ equals the number of phases of said field-piece and $g$ equals the slip frequency induced in said squirrel-cage rotor;
    (h) subdividing distributing means fed by said relaxation oscillator means; and
    (i) logical decoding circuitry fed by said distributing means and comprising one logic unit for each of said switch means for feeding thereto pulses at a rate $g$ for generating a rotating field in said field-piece.

2. A device as recited in claim 1 further comprising a tachometric control means connected between said alternator and said relaxation oscillator for varying the pulse rate of the latter in accordance with the rate of rotation of the former.

3. A device as recited in claim 2 wherein said tachometric control means comprises a voltage comparator controlling said oscillator, a voltage detector connected to one phase of said alternator armature for producing a signal proportional to the speed of said armature and for applying said signal as one input to said comparator, and an adjustable reference voltage source connected as another input to said comparator, the voltage produced by said source being equal to that produced by said detector when said armature is rotating at the desired speed.

References Cited by the Examiner

UNITED STATES PATENTS

| | | | |
|---|---|---|---|
| 2,236,984 | 4/1941 | Alexanderson | 318—237 X |
| 2,585,573 | 2/1952 | Moore | 318—231 |
| 2,659,044 | 11/1953 | MacNeil | 310—112 X |
| 2,685,055 | 7/1954 | Winther | 318—231 |
| 2,784,365 | 3/1957 | Fenemore | 318—231 X |
| 2,791,734 | 5/1957 | Kieffert | 318—231 X |
| 3,164,760 | 1/1965 | King | 318—231 X |

ORIS L. RADER, *Primary Examiner.*

C. E. ROHRER, G. A. FRIEDBERG,
*Assistant Examiners.*